No. 820,637. PATENTED MAY 15, 1906.
A. D. GABLE & J. BRICKLEY.
SAFETY DEVICE FOR ELEVATORS.
APPLICATION FILED FEB. 9, 1906.
2 SHEETS—SHEET 1.
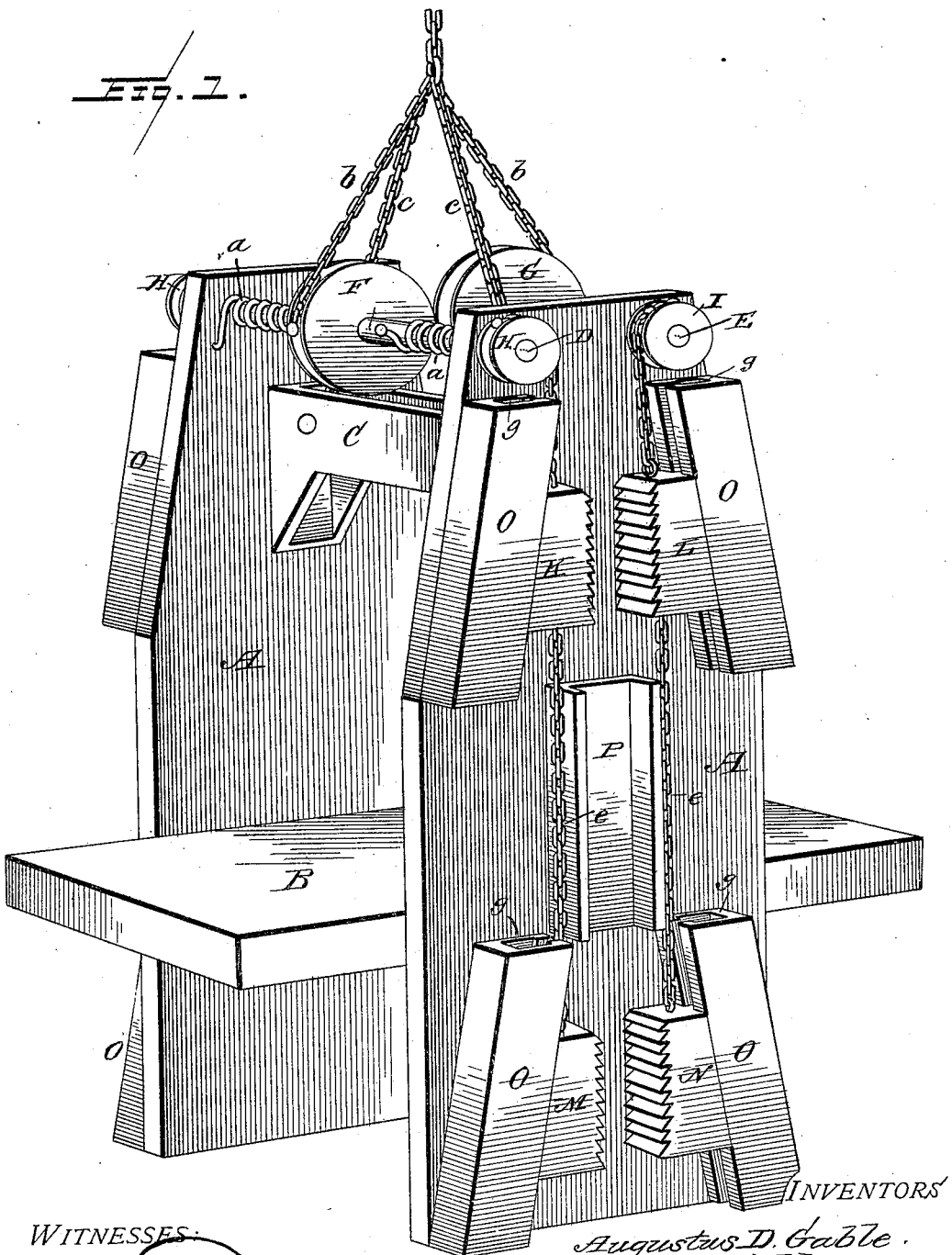

No. 820,637. PATENTED MAY 15, 1906.
A. D. GABLE & J. BRICKLEY.
SAFETY DEVICE FOR ELEVATORS.
APPLICATION FILED FEB. 9, 1906.
2 SHEETS—SHEET 2.
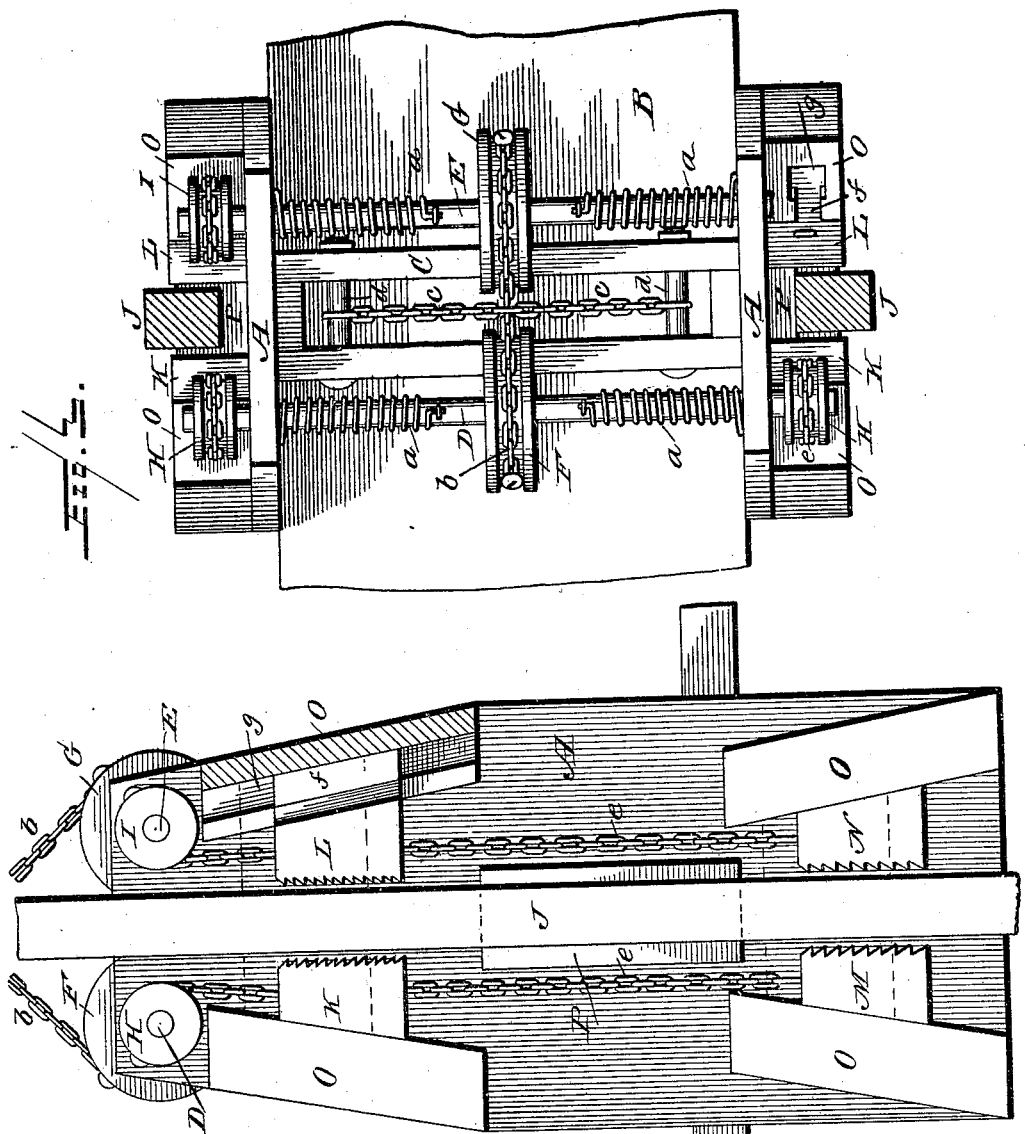
WITNESSES
INVENTORS
Augustus D. Gable
John Brickley
By
Attorney

UNITED STATES PATENT OFFICE.

AUGUSTUS D. GABLE AND JOHN BRICKLEY, OF SHENANDOAH, PENNSYLVANIA.

SAFETY DEVICE FOR ELEVATORS.

No. 820,637.

Specification of Letters Patent.

Patented May 15, 1906.

Application filed February 9, 1906. Serial No. 300,244.

*To all whom it may concern:*

Be it known that we, AUGUSTUS D. GABLE and JOHN BRICKLEY, citizens of the United States, residing at Shenandoah, in the county of Schuylkill and State of Pennsylvania, have invented certain new and useful Improvements in Safety Devices for Elevators; and we do hereby declare that the following is a full, clear, and exact description of the same, reference being had to the annexed drawings, making a part of this specification, and to the letters of reference marked thereon.

The present invention has relation to safety devices for elevators, and has for its object to provide a simple and effective means for automatically arresting the descent of the elevator in the event of the hoisting-cable breaking, and thereby prevent any accident happening or resulting therefrom.

The invention consists in a safety device for elevators constructed substantially as shown in the drawings and hereinafter described and claimed.

Figure 1 of the drawings is a perspective view of an elevator constructed in accordance with our invention; Fig. 2, a side view thereof, partly in section; Fig. 3, a top plan view.

In the accompanying drawings the cab or cage of the elevator consists of the side walls A and the platform B, which may be of any suitable construction, the side walls being connected by a transverse bracing-frame C, near the upper ends thereof.

Two longitudinal transverse rotatable shafts D E have their bearings in the side walls A and extend out beyond the same and are spring-actuated through the medium of coiled springs $a$, which encircle said shafts, one end of the springs being secured to the shafts and the opposite ends secured to the side wall of the cab or cage. At or near the center of the shafts are suitably connected thereto grooved pulleys, the pulley F being secured to the shaft D and the pulley G to the shaft E, and extending over these grooved pulleys are chains $b$, with their ends connected to said pulleys, as shown in Fig. 3 of the drawings. Connected to the chains $b$ are chains $c$, the ends thereof being fastened in any suitable manner to suitable bolts $d$, which extend transversely through the bracing-frame C, and a hoisting-cable is secured to said chains, as shown in Fig. 1 of the drawings, or any suitable flexible connections may be used in place of the chains shown, as found most preferable.

The brake mechanism herein employed is a material improvement over the mechanism in ordinary use, as provision is made to hold the cab or cage against descent through the medium of four clutches upon each side thereof, thereby gripping the upright standards upon both sides and near the top and bottom of the cab or cage. The clutches, as represented at K L and M N, are preferably provided with serrated faces and may be of any suitable construction, said clutches working in grooved cam-brackets O, which are secured to the side walls A on an incline, so that the brackets will act as cams against the clutches as the cab or cage descends. The clutches above described are connected to chains $e$, and said chains are in turn connected to the grooved pulleys H I upon the projecting ends of the rotatable shafts D E.

The side walls A of the cab or cage are provided with grooved guides P to engage the stationary standards J, so that the cab or cage will be guided in its vertical movement.

The clutches (represented at K, L, M, and N) are provided with T-shaped tongues $f$, as shown in Fig. 3 of the drawings, which engage similarly-formed grooves $g$ in the cam-brackets O.

The spring-actuated shafts D E are designed to draw the clutches upward the moment the cable breaks, as when the shafts are released from tension through the upward pull on the chains the spring on said shafts will cause the shafts to turn in the direction to wind up the chains upon the pulleys H I and carry upward the clutches, and through the medium of the grooved cam-guides O the serrated or toothed faces of the clutches will be brought against the standards J, and upon any downward movement of the cab or cage the clutches will be brought in closer contact with the standards.

Through the medium of the grooved cam-guides the clutches are operated by the spring-actuated shafts hereinbefore described and also by any downward movement of the cab or cage, providing a double means of security against the descent of the cab or cage.

Having now fully described our invention, what we claim as new, and desire to secure by Letters Patent, is—

A safety device for elevators, comprising a suitable cab or cage, spring-actuated rotatable shafts, pulleys upon said shafts between the side walls of the cab or cage, flexible connections engaging the pulleys, pulleys upon the outer ends of the shafts, grooved cam-brackets arranged in vertical pairs upon each side of the walls of the cab or cage, clutches arranged in pairs at the upper and lower ends of the cab or cage upon both sides thereof, each pair of said clutches being connected with each other and the several pairs to the pulleys upon the ends of the rotatable shafts whereby the clutches will operate simultaneously, substantially as and for the purpose set forth.

In testimony whereof we affix our signatures in presence of two witnesses.

AUGUSTUS D. GABLE.
JOHN BRICKLEY.

Witnesses:
W. T. LEE,
MAX LEVIT.